United States Patent
Cockrell et al.

(10) Patent No.: US 10,736,447 B2
(45) Date of Patent: Aug. 11, 2020

(54) MODIFIED SPOON TO REDUCE THE DRIPPING OF LIQUIDS

(71) Applicants: John Patrick Cockrell, Bermuda Dunes, CA (US); Jessica Sweet Ipina, Bermuda Dunes, CA (US)

(72) Inventors: John Patrick Cockrell, Bermuda Dunes, CA (US); Jessica Sweet Ipina, Bermuda Dunes, CA (US)

( * ) Notice: Subject to any disclaimer, the term of this patent is extended or adjusted under 35 U.S.C. 154(b) by 0 days.

(21) Appl. No.: 15/955,582

(22) Filed: Apr. 17, 2018

(65) Prior Publication Data

US 2018/0344065 A1 Dec. 6, 2018

Related U.S. Application Data

(60) Provisional application No. 62/515,826, filed on Jun. 6, 2017.

(51) Int. Cl.
*A47G 21/04* (2006.01)
*A47J 43/28* (2006.01)
*G01F 19/00* (2006.01)

(52) U.S. Cl.
CPC ............ *A47G 21/04* (2013.01); *A47J 43/281* (2013.01); *G01F 19/002* (2013.01)

(58) Field of Classification Search
CPC ....... A47G 21/04; A47J 43/281; A47J 43/282; G01F 19/002
USPC .................................................. 30/314, 327
See application file for complete search history.

(56) References Cited

U.S. PATENT DOCUMENTS

| | | | | |
|---|---|---|---|---|
| D52,667 | S | * 11/1918 | Maynard | 30/324 |
| D92,118 | S | * 4/1934 | Stuart | D10/46.3 |
| 2,249,551 | A | * 7/1941 | Zohe | A61J 7/0023 30/324 |
| 2,654,252 | A | * 10/1953 | Davis | A47G 21/04 30/324 |
| 2,853,779 | A | * 9/1958 | Lordo | A47G 21/02 30/1 |
| 2,995,265 | A | * 8/1961 | Soderberg | A47G 21/04 215/390 |
| 3,369,407 | A | * 2/1968 | Hein | G01F 19/002 73/427 |
| 4,524,513 | A | | 6/1985 | Intini, Jr. |
| 4,957,226 | A | | 9/1990 | Pacia |
| 5,005,294 | A | * 4/1991 | Roberts | A47J 43/285 30/324 |
| D332,579 | S | | 1/1993 | Goldman |
| 5,279,036 | A | * 1/1994 | Rambin | A47G 21/004 30/137 |
| D364,076 | S | * 11/1995 | Lordo | D7/642 |

(Continued)

*Primary Examiner* — Omar Flores Sanchez
(74) *Attorney, Agent, or Firm* — Kirk A. Buhler; Buhler & Associates

(57) ABSTRACT

Improvements in a spoon that reduces the dripping of liquids is disclosed. The spoon is used for the preparing, serving and eating food. The spoon has a structure that reduces or prevents dripping from a bottom surface of the spoon. The spoon has a bowl with an interior and a back surface. A neck is attached to the bowl. A handle extends from the neck. The bowl has a divot that extends from the back surface of the bowl inward into the interior of the bowl. The divot provides an annular or elliptical enlarged surface to eliminate the radius bottom of a spoon to reduce the potential for drops forming and dropping from the bottom of the bowl.

20 Claims, 3 Drawing Sheets

(56) References Cited

U.S. PATENT DOCUMENTS

| | | | | |
|---|---|---|---|---|
| 5,560,109 | A | * | 10/1996 | Lam ................... A47J 43/284 |
| | | | | 30/324 |
| 5,697,160 | A | * | 12/1997 | Pritsker ............... A47G 21/026 |
| | | | | 30/324 |
| D412,813 | S | * | 8/1999 | Roskind .......................... 30/324 |
| 6,640,448 | B2 | | 11/2003 | Mardell |
| D483,478 | S | | 12/2003 | Carraher |
| 6,851,574 | B1 | * | 2/2005 | Traynor ................ A47G 21/04 |
| | | | | 222/1 |
| 8,683,705 | B2 | | 4/2014 | Evans et al. |
| 8,857,065 | B2 | * | 10/2014 | Behbehani ............ A47G 21/04 |
| | | | | 30/324 |
| 2002/0166242 | A1 | | 11/2002 | Huang |
| 2010/0011592 | A1 | * | 1/2010 | Hougland .............. A47G 21/04 |
| | | | | 30/324 |

\* cited by examiner

MODIFIED SPOON TO REDUCE THE DRIPPING OF LIQUIDS

CROSS REFERENCE TO RELATED APPLICATION

This application claims the benefit of U.S. Provisional Application Ser. No. 62/515,826 filed Jun. 6, 2017 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a spoon. More particularly, the bowl of the spoon has a rounded center area that to reduces or eliminates the dripping of liquids from a bottom surface of the bowl.

Description of Related Art including information disclosed under 37 CFR 1.97 and 1.98

Spoons are used to lift fluids or semi-solids from a bowl, pot or plate. Most fluids are held within the outer lip of the spoon. Traditional spoons include a bowl portion and a handle that extends from the bowl portion. While traditional spoons are effective for preparing, eating, or serving foods, often times liquids drip off of a bottom surface of the bowl portion due to the rounded shape. This can cause stains around the bowl and on the clothing of the person that is eating.

A number of patents and or publications have been made to address these issues. Exemplary examples of patents and or publication that try to address this/these problem(s) are identified and discussed below.

U.S. Pat. No. 4,957,226 issued on Sep. 18, 1990 to Dante V. Pacia is titled Automatic Food Dispensing Method, Apparatus and Utensil. This patent discloses an apparatus comprise a pumping system from a supply through a pump in a controlled amount with a reverse action of the pump after the appropriate amount has been dispensed in order to avoid it dripping. The device consists of a spoon or other appropriately shaped utensil attached to a hollow handle which terminates in a non-interfering connection with the interior of the utensil at one end and terminates at the other end in a connection to a food supply source. While this patent discloses a spoon that does not drip, the spoon uses a vacuum to draw any drops back through the handle of the spoon.

U.S. Pat. No. 6,640,448 issued Nov. 4, 2003 to Alison Mardell is titled Liquid Deflecting Device. This patent discloses a liquid deflecting device which can be in the form of a spoon and which has a bowl having an undersurface presenting a first generally concave region forming a pour depression and arranged to receive liquid delivered onto the device, a second region arranged to be in communication with the first region by means of a lip (24) and allowing for the controlled escape of liquid therefrom. This patent uses multiple connected flow regions to move fluid between the connected surfaces but does not prevent dripping from under the spoon.

U.S. Pat. No. 8,683,705 issued Apr. 1, 2014 to Scott Evans et al and is titled Dosing Spoon. This patent discloses a provided with two bowl portions, each with a front end for oral insertion, a back end, and a top edge along the circumference of the bowl. The spoon also has a handle portion that extends between each bowl. The bottom of each bowl is flat to allow the dosing spoon to be stable on a flat surface. While this patent has a non-dome bottom surface the flat bottom surface can promote dripping of the spoon(s).

What is needed is a spoon with a modified bowl portion to prevent or reduce dripping of liquid therefrom. The spoon disclosed in this document provides the solution

BRIEF SUMMARY OF THE INVENTION

It is an object of the spoon that reduces the dripping of liquids to have a configuration that is similar to a common spoon. The shape provides an embodiment that is easily recognizable to a user and can be easily used without concern about how to use the utensil.

It is another object of the spoon that reduces the dripping of liquids to have a structure that reduces or prevents dripping from a bottom surface. The spoon has a bowl with an interior and a back surface. A neck is attached to the bowl. A handle extends from the neck. The bowl has a divot that extends from the back surface inward into the interior of the bowl. The divot is preferably round or elliptical but could also be rectangular in overall appearance.

It is another object of the spoon that reduces the dripping of liquids to have an equivalent interior bowl volume to a common teaspoon or tablespoon. This allows a user to replace their existing spoons for both food consumption and for measurements. While the spoon interior volume can be the same as other teaspoons and tablespoons, the volume can be larger or smaller.

It is still another object of the spoon that reduces the dripping of liquids to be formed from metal such as stainless steel, silver or plastics. These materials are most common, and plastic spoons can be disposable or recyclable.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
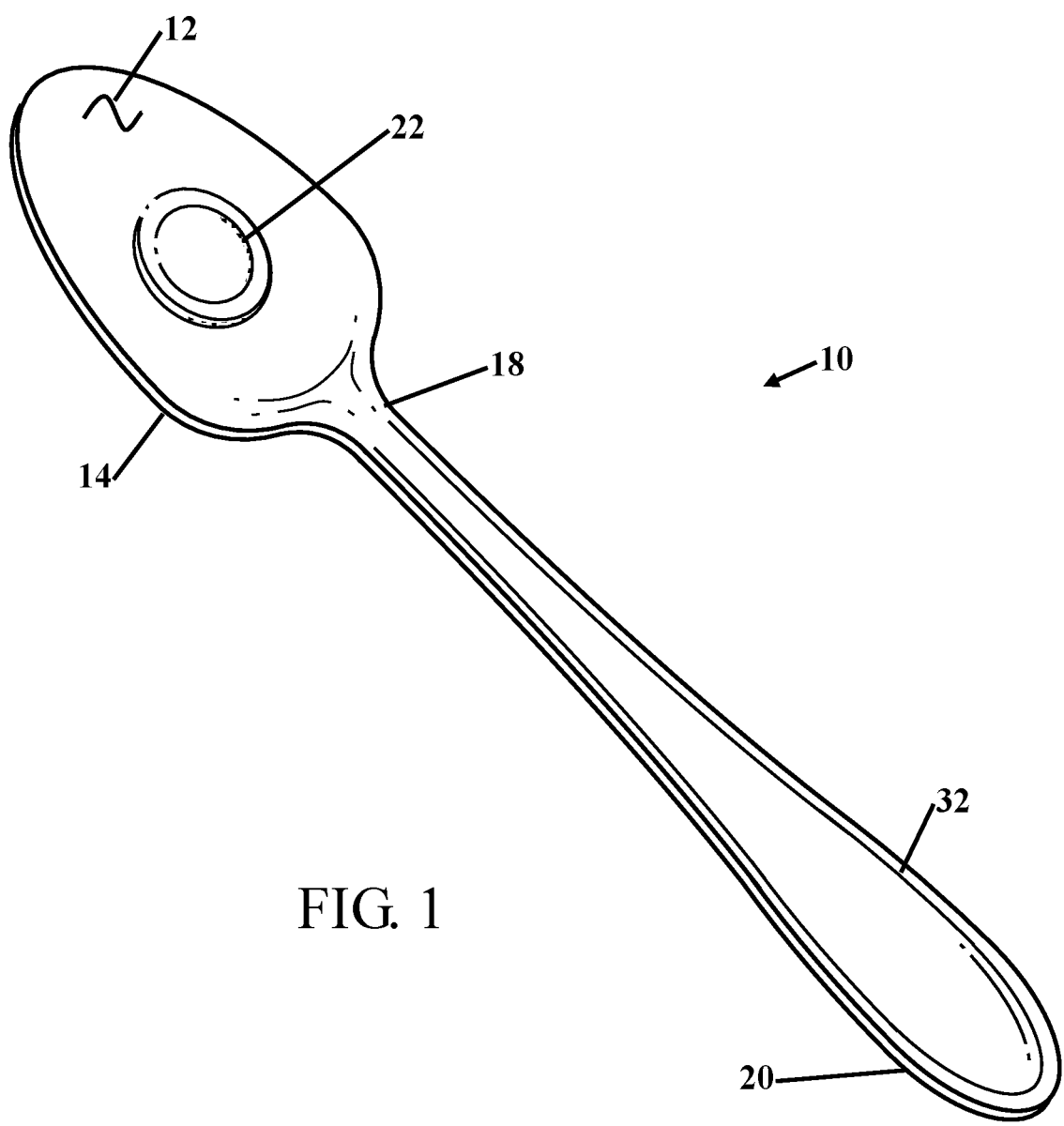
FIG. 1 shows a perspective view of a spoon that reduces the dripping of liquids.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

Figure 2:
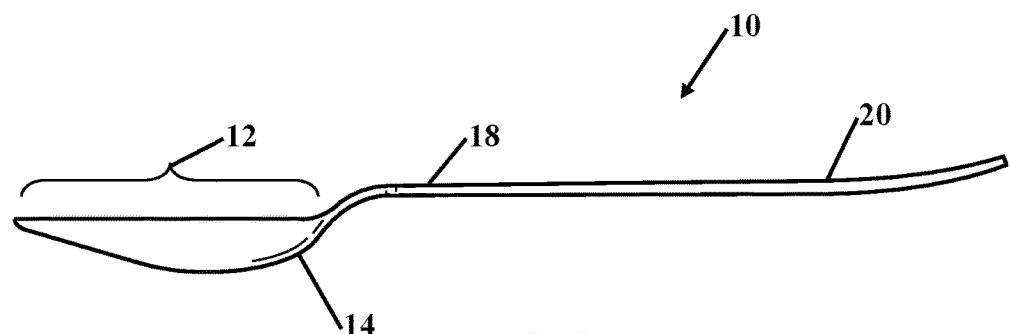
FIG. 2 shows a side view of a spoon that reduces the dripping of liquids.
Figure 3:
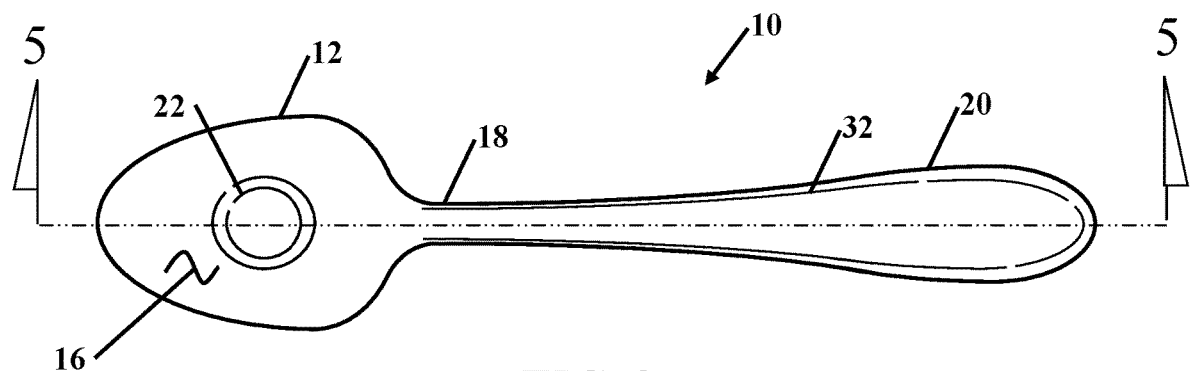
FIG. 3 shows a top plan view of a spoon that reduces the dripping of liquids.

Item Numbers and Description
10 spoon
12 bowl
14 back surface
16 interior
18 neck
20 handle
22 divot
24 radius
26 height
28 rim
30 depression
32 cosmetic detail
34 upper rim
36 inside FIG. 1 shows a perspective view of a spoon 10 that reduces the dripping of liquids, FIG. 2 shows aside view of a spoon 10 that reduces the dripping of liquids and FIG. 3 shows a top plan view of a spoon 10 that reduces the dripping of liquids. The spoon is used for preparing, serving, and eating food, wherein the spoon 10 has a structure that reduces or prevents dripping from a bottom surface. This list of possible constituent elements is intended to be exemplary only, and it is not intended that this list be used to limit the device of the present application to just these elements.

The spoon 10 is an elongated shape with an elongated handle 20 that is used to grasp the spoon. The length, height and width of the handle is selected based upon the function of the spoon and user preference. The opposing end of the elongated handle 20 is a bowl 12 area. The bowl area has an internal volume that is sized based upon the use or can be configured with a volume of one teaspoon, one tablespoon or other volume. While the embodiment shown is sized and shaped as an eating utensil, the spoon 10 can be the configuration of a ladle or larger spoon. It is contemplated that the internal volume of the bowl can be a measure or random volume of up to one-cup (8 fluid ounces) or more.

In this embodiment the handle 20 has some cosmetic detailing 32. The detailing can be purely cosmetic or can provide some additional structural integrity to the spoon 10 based upon the desired design characteristics of the spoon. The end of the handle 20 can be configured to allow the outer edge of said bowl to be level with the horizon.

The bowl 12 has an interior 16 dished area that is configured to hold fluid and a back surface 14 is essentially convex with the exclusion of the divot 22 that is located in a central area of the bowl 12. The divot 22 extends from the back surface 14 inward into the interior 16 of the bowl 12. Connecting the bowl 12 to the elongated handle 20 is a narrowed neck 18. These figures show that the divot 22 is substantially central located in the within the forward and aft portions of the bowl 12. The divot 22 is aligned within the centerline of the spoon 10 and is centerline mirror symmetrical in the spoon 10.

The size of the divot 22 may be proportionate to the size of the spoon 10. The divot 22 may have any desired shape and, in some embodiments, has a substantially circular opening, such that the divot 22 is semi-spherical as shown in the cross-sectional images of this disclosure. The divot 22 may be concave in shape. The divot 22 may function to trap or hold liquid on the back 14 of the bowl 12, where in conventional spoons, the liquid would drop off the rounded bottom of the bowl 12. Thus, the spoon of the present disclosure may reduce or prevent dripping of liquids from a back surface 14 of the bowl 12.

Figure 4:
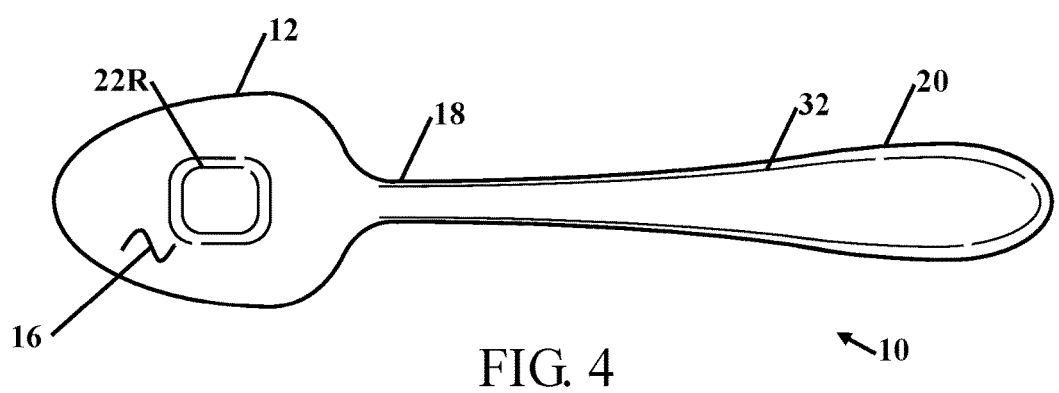
FIG. 4 shows a top plan view of a spoon with a rectangular divot.

FIG. 4 shows a top plan view of a spoon with a rectangular divot 22R. The divot is preferably round or elliptical but this figure shows that the divot could also be rectangular or rounded rectangular in overall appearance without reducing the effectiveness of preventing a drop from forming. Other creative variation such as teardrop, triangular, octagonal or other multi-sided shapes.

The spoon 10 of the present disclosure may be used similar to a conventional spoon and may be made of any suitable materials, such as those used to make conventional spoons, including but not limited to, metals such as stainless steel, silver and copper or plastics. When the spoon 10 is constructed from metal the spoon 10 is formed from sheet metal wherein the divot 22 is formed with the bowl of the spoon or with a secondary operation where the divot 22 is pressed into the underside back surface 14 of the spoon 10. This construction method allows the divot 22 to be formed in pre-existing spoons.

Figure 5:
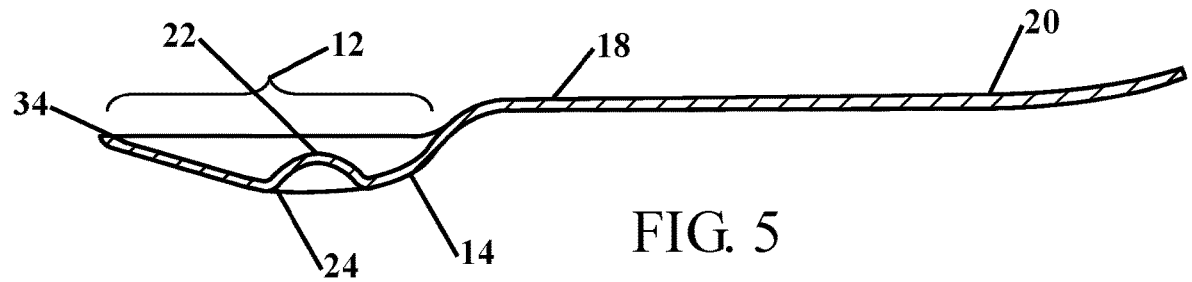
FIG. 5 shows a cross-sectional view of the spoon from FIG. 3 cut through section 5-5.
Figure 6:
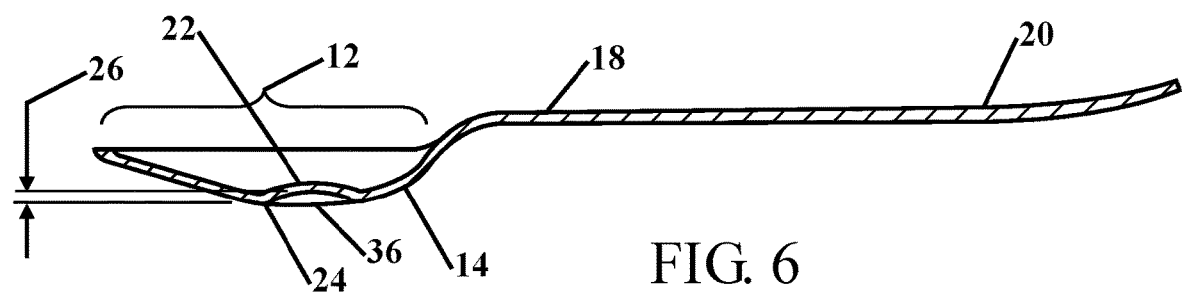
FIG. 6 shows a second preferred embodiment of the cross-section.
Figure 7:
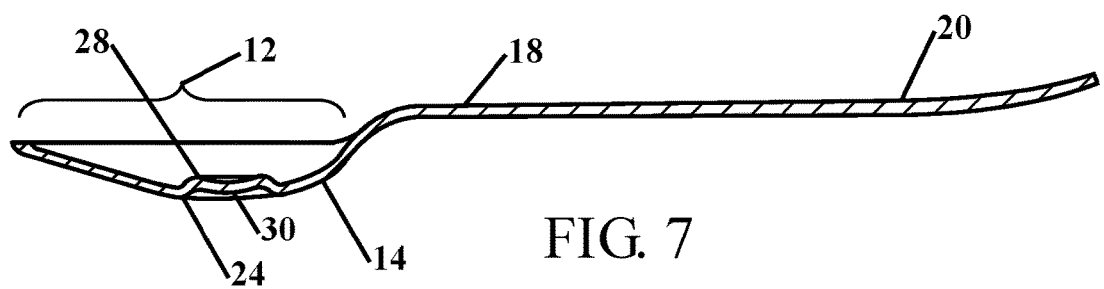
FIG. 7 shows a third embodiment of the cross-section.

FIG. 5 shows a cross-sectional view of the spoon 10 from FIG. 3 cut through section 5-5. FIG. 6 shows a second preferred embodiment of the cross-section and FIG. 7 shows a third embodiment of the cross-section. In these figures the handle 20 is shown to the right of the figures. The handle 20 is elongated and mostly flat. The handle extends to the neck 18 that connects to the bowl 12. The divot 22 extends vertically from the back surface 14. FIGS. 5 and 6 show different heights 26 of the divot 22 extending from the inside of the bowl 12.

In both of these embodiments the top of the divot 22 exists below the upper rim 34 of the bowl 12. From the hack surface 14 of the bowl 12 the outer radius 24 of the divot 22 creates a larger surface area to the bottom of the spoon 10. This larger surface area disperses the location where a drop can be formed. The inside 36 of the divot 22 can further create some capillary action to retain any fluid within the inside 36 of the divot 22.

In the embodiment shown in FIG. 7, the divot has a compound shape with a radius 24. Any drops that form on the bottom of the depression 30 are drawn by capillary action into the annular depression around the radius 24. It is further contemplated that the depression 30 can be a flat surface that exist within the radius 24. The different shapes of the divot will provide a different sensation to the user of the spoon, but the addition of the divot will also change the overall height of the bowl.

In another contemplated embodiment the spoon 10 can be formed such that the interior volume of the bowl 12 can have a volume of a tablespoon, while the interior volume of the divot 22 can have the volume of a teaspoon. The volume of a tablespoon in the US is ½ fluid ounce and the US volume of a teaspoon is about ⅓ the volume of a tablespoon.

Thus, specific embodiments of a spoon that reduces the dripping of liquids have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A spoon that reduces the dripping of liquids comprising:
   a bowl with an interior and a back surface;
   a narrowed neck attached to said bowl;
   a handle extending from said neck;
   said bowl includes a divot that is centered in a bottom of said bowl;
   said divot has a compound rounded depression within said divot;
   said divot extends from said back surface inward into an interior of said bowl, and
   said divot has radiused surface that is essentially parallel with an upper rim of said bowl.

2. The spoon that reduces the dripping of according to claim 1, wherein said spoon is configured for use in preparing, serving and eating food.

3. The spoon that reduces the dripping of according to claim 1, wherein said bowl has an interior volume of a teaspoon or a tablespoon.

4. The spoon that reduces the dripping of according to claim 1, wherein said bowl has an interior volume of one tablespoon and the volume of the divot is one teaspoon.

5. The spoon that reduces the dripping of according to claim 1, wherein said spoon is fabricated from stainless steel, silver, copper or plastic.

6. The spoon that reduces the dripping of according to claim 1, wherein said bowl has a volume of between one teaspoon and one cup.

7. The spoon that reduces the dripping of according to claim 1, wherein said handle is configured to allow said an upper rim of said bowl to be level with a horizon when a free end of said handle is horizontal.

8. The spoon that reduces the dripping of according to claim 1, wherein said handle further includes at least one cosmetic detail.

9. The spoon that reduces the dripping of according to claim 1, wherein said divot is rounded, teardrop, triangular, multi-sided, rectangular or rounded rectangular.

10. The spoon that reduces the dripping of according to claim 1, wherein said compound rounded depression extends into said bowl.

11. The spoon that reduces the dripping of according to claim 1, wherein said divot is rounded into said bowl.

12. The spoon that reduces the dripping of according to claim 1, wherein said divot has a flattened surface that is parallel with said upper rim of said bowl.

13. The spoon that reduces the dripping of according to claim 1, wherein said divot is surrounded by a radiused surface.

14. The spoon that reduces the dripping of according to claim 13, wherein droplets are drawn by capillary action into the annular depression around the radiused surface of the divot.

15. The spoon that reduces the dripping of according to claim 1, wherein said neck is narrower than said handle.

16. The spoon that reduces the dripping of according to claim 1, wherein said spoon is a ladle.

17. The spoon that reduces the dripping of according to claim 1, wherein said spoon has an internal volume of between 1/6 fluid and 1/3 fluid ounce.

18. The spoon that reduces the dripping of according to claim 1, wherein said spoon is formed from sheet metal.

19. The spoon that reduces the dripping of according to claim 10, wherein said compound rounded depression is convex.

20. The spoon that reduces the dripping of according to claim 15, wherein said handle is curved.

* * * * *